(12) United States Patent
Kuivamäki et al.

(10) Patent No.: US 6,209,690 B1
(45) Date of Patent: Apr. 3, 2001

(54) LOAD BRAKE

(75) Inventors: Ismo Kuivamäki, Vantaa; Mika Kuusela, Hyvinkää, both of (FI)

(73) Assignee: KCI Konecranes International PLC, Hyvinkää (FI)

( * ) Notice: Subject to any disclaimer, the term of this patent is extended or adjusted under 35 U.S.C. 154(b) by 0 days.

(21) Appl. No.: 09/168,173

(22) Filed: Oct. 8, 1998

(30) Foreign Application Priority Data

Oct. 8, 1997 (FI) ........................................................ 973910

(51) Int. Cl.[7] ........................................................ B60T 8/72
(52) U.S. Cl. ..................... 188/187; 192/12 B; 192/89.21; 254/356; 188/82.7; 188/264 R
(58) Field of Search ................................. 188/82.1, 82.7, 188/82.77, 166, 184, 187, 264 B, 264 D, 264 F, 264 R; 242/396.9; 254/378, 375, 356; 192/12 B, 54.5, 89.21, 93 A

(56) References Cited

U.S. PATENT DOCUMENTS

| | | | |
|---|---|---|---|
| 2,202,137 | * | 5/1940 | Brown .................................. 188/264 |
| 2,254,989 | * | 9/1941 | Benson ................................. 254/187 |
| 2,501,096 | * | 3/1950 | Robins et al. ........................ 192/15 |
| 3,071,349 | * | 1/1963 | Glaze .................................... 254/186 |
| 3,756,359 | * | 9/1973 | Suez et al. .............................. 192/16 |
| 4,004,780 | * | 1/1977 | Kuzarov ........................... 254/187 A |
| 4,046,235 | * | 9/1977 | Shutt .................................... 188/134 |
| 4,060,159 | * | 11/1977 | Chaney et al. ..................... 192/113 B |
| 4,251,060 | * | 2/1981 | Suzuki et al. ........................ 254/356 |
| 4,390,161 | * | 6/1983 | Nelson ................................. 254/356 |
| 4,690,379 | | 9/1987 | Nakamura . |

FOREIGN PATENT DOCUMENTS 1556373   1/1970   (DE) .

* cited by examiner

Primary Examiner—Robert J. Oberleitner
Assistant Examiner—Bradley King
(74) Attorney, Agent, or Firm—Birch, Stewart, Kolasch & Birch, LLP

(57) ABSTRACT

A load brake having a load shaft, a flange-like pressure plate fixedly mounted onto the load shaft, and a cogwheel arranged on the load shaft. A tension device produces an axial motion and force in the cogwheel as the wheel rotates with respect to the load shaft, and a ratchet wheel is mounted between the pressure plate and the cogwheel. A pawl prevents the rotation of the ratchet wheel at least in the release direction of the load shaft, and friction surfaces are provided between the pressure plate and the ratchet wheel, and the ratchet wheel and the cogwheel. Rotation that tends towards the release direction of the load shaft and that is faster than the speed of rotation of the cogwheel brings the pressure plate and the cogwheel closer together in the axial direction and presses them against the ratchet wheel. Rotation that occurs in the release direction of the load shaft that is directed at the cogwheel, and that exceeds the braking torque and that is faster than the speed of rotation of the load shaft removes the pressure plate and the cogwheel further apart in the axial direction and thus unlocks the braking connection of the pressure plate, the ratchet wheel and the cogwheel. A preclamping device is provided in connection with one friction pair of the friction pairs formed by the pressure plate and the ratchet wheel, and the ratchet wheel and the cogwheel, which produces an axial preclamping force that presses the elements of the friction pair together.

14 Claims, 4 Drawing Sheets

LOAD BRAKE

BACKGROUND OF THE INVENTION

1. Technical Field

The invention relates to a load brake comprising a load shaft, a flange-like pressure plate fixedly mounted onto the load shaft, a cogwheel arranged on the load shaft with tension means which produce an axial motion and force in the cogwheel as the wheel rotates with respect to the load shaft, a ratchet wheel mounted between the pressure plate and the cogwheel, a pawl for preventing the rotation of the ratchet wheel at least in the release direction of the load shaft, friction surfaces provided between the pressure plate and the ratchet wheel, and the ratchet wheel and the cogwheel, whereupon rotation that tends towards the release direction of the load shaft and that is faster than the speed of rotation of the cogwheel brings the pressure plate and the cogwheel closer together in the axial direction and presses them against the ratchet wheel, which results in the braking of the rotational movement of the load shaft, whereas rotation that occurs in the release direction of the load shaft, that is directed at the cogwheel, that exceeds the braking torque and that is faster than the speed of rotation of the load shaft removes the pressure plate and the cogwheel further apart in the axial direction and therefore unlocks the braking connection of the pressure plate, the ratchet wheel and the cogwheel.

2. Background Art

This type of load brake is used especially in a hoist gear unit of a hoist, where the purpose is to ensure that the movement of the load is stopped and the load remains suspended even when the primary brake of the hoist, which usually means a brake provided on the shaft of the hoist motor, is damaged and cannot therefore stop or hold the load.

The load brake does not brake during the hoisting, but during the descent of the load there is in the brake a torque which equals at least the load torque and against which the motor and the load work. This work is converted into heat, which is harmful for the operation of the gear since the properties of the lubricating oil in the gear deteriorate at high temperatures.

Consequently, during the descent of the load there must be in the load brake a torque that is at least equal to the load, so that the load can be controlled, if necessary, even when the primary brake or the primary step of the gear is damaged. In conventional load brake constructions, a sufficient brake torque has been ensured by sizing the elements of the load brake such that the torque produced by the load in the brake greatly exceeds the torque corresponding to the load. As a result, more energy is converted into heat in the load brake than just the potential energy of the load. This reduces the degree of utilization of the application (e.g. a hoist) since the lubricating oil of the gear reaches its highest allowed working temperature with a lower degree of utilization than if the oil were only heated by the potential energy of the load. Further, the motor is required to compensate for the difference between the torque of the load brake and the load torque, which means that the motor does more work than if the torque of the load brake were closer to the load torque. The motor therefore warms up too much unnecessarily.

The load brake is in principle a construction that is formed of a "screw" and a "nut" and a "non-rotating element", which is provided between the former two but which is generally allowed to rotate during the hoisting in the direction of hoisting so that the brake does not drag. The component that allows the rotation in the hoisting direction of the load and that prevents the rotation in the opposite lowering direction of the load, i.e. in the direction in which the load shaft is released, is a one-way switch. The "non-rotating element" and the one-way switch may be referred to herein as a ratchet mechanism which consists of a ratchet wheel and a pawl, as mentioned at the beginning.

Friction surfaces are attached to the head of the "screw" and to one side of the "nut", these surfaces resting on the surfaces of the ratchet wheel. The load torque tries to turn the "screw" into the "nut", which produces a compression force on the friction surfaces. The torque of the load brake is therefore a function of the geometry and friction coefficients of the friction surfaces and the screw system. If the "nut" rotates when the "screw" is tightened, the axial force cannot increase and the brake is not provided with a sufficient torque. On the other hand, the aforementioned geometry and friction coefficients also affect the degree of tightness of the load brake during the normal operation of the hoist. At worst the brake may be jammed so that the torque of the hoist motor cannot unlock it. In such a case, the load remains suspended in the air and it must be removed from the hook or the load brake must be opened manually. The friction surfaces may also be attached to the ratchet wheel, in which case the heat that is generated due to the friction is transferred to the rotating parts and from there to the oil.

The combination of a "screw" and a "nut" can also be replaced with a "camnut" construction, which is a special kind of screw-and-nut combination consisting of two elements that rest one against the other and that have corresponding cam surfaces. If a load brake has such a construction, the brake may start vibrating when a small load is lowered. The reason for this is that the hoist motor unlocks the load brake so rapidly that a small load does not have time to rapidly move one half of the "camnut" out of the way, but the cams collide. This collision in turn accelerates the load so that the brake is relocked and the motor must unlock it once again. Some load brake manufacturers have tried to eliminate this drawback by providing an axial force between the friction surfaces, this force being independent of the load and producing in the brake an initial torque that is constant. This does prevent the brake from vibrating but it increases the heat generation of the brake and it does not ensure that the load torque tightens the brake.

SUMMARY OF THE INVENTION

A purpose of the present invention is to eliminate the above-described drawbacks. This is obtained with a load brake according to the invention, in which means are provided in connection with one of the friction pairs formed by the pressure plate and the ratchet wheel, and the ratchet wheel and the cogwheel, these means producing an axial preclamping force that presses the elements of the friction pair together.

The basic idea in the load brake construction according to the invention is that the load brake is a "screw/nut" combination, preferably a special "camnut" construction as described above. When the rotation of the "nut" is prevented, turning the "screw" into the "nut" produces an axial force that is dependent on the torque of the "screw" and on the friction coefficient. In the load brake, this axial force produces compression between the friction surfaces. The torque of the load brake is a function of this axial force and of the measures of the friction surfaces and the friction coefficient. Since in a load brake the "nut" is for example one of the cogwheels in the hoist gear, it cannot be locked so that it would not rotate. According to the invention, an axial force is provided in connection with only one friction pair, preferably in connection with the "nut" or the cogwheel and the ratchet wheel, and this force is produced preferably with a spring means that may be for example a cup spring. This axial force is not dependent on the load torque, but it is adjusted to such a level that between the "nut" and the ratchet wheel there is a torque that is greater than the friction torque of the "camnut" or the thread. This condition must hold true with all loads.

When the tightening of the brake has been ensured with all forces, the brake torque can be adjusted closer to the load torque, i.e. it can be provided with a smaller margin of safety. As a result, the brake warms the gear oil less than a load brake provided with a greater margin of safety. Consequently, for example the degree of utilization of the hoist can be increased. Similarly, the torque required of the hoist motor during the descent of the load is smaller than when a conventional load brake is used. Thus, the degree of utilization of the motor can also be higher, or the motor can be correspondingly smaller.

When the hoist is operated in the down direction, the hoist motor unlocks the brake, which would normally result in vibrations, as described above. In the arrangement according to the invention, however, the torque prevailing at one friction pair acts as a friction damper that absorbs the vibration energy, wherefore no vibration occurs.

The amount of potential energy converted into heat by the load brake is rather great with big loads, and therefore the brake surfaces are subjected to a great thermal stress, which might even cause destruction of the friction surfaces. In the load brake construction according to the invention, the friction surfaces are preferably provided with a continuous flow of oil that both cools and lubricates the surfaces. This can be carried out by providing the rotating parts of the brake with suction holes and ducts along which the oil is transferred to the friction surfaces. It is clear that the lubrication and the cooling lengthen the service life of the friction surfaces and standardize the conditions under which the friction surfaces must operate. This is one of the factors which enable the more accurate sizing of the brake, i.e. a smaller margin of safety.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
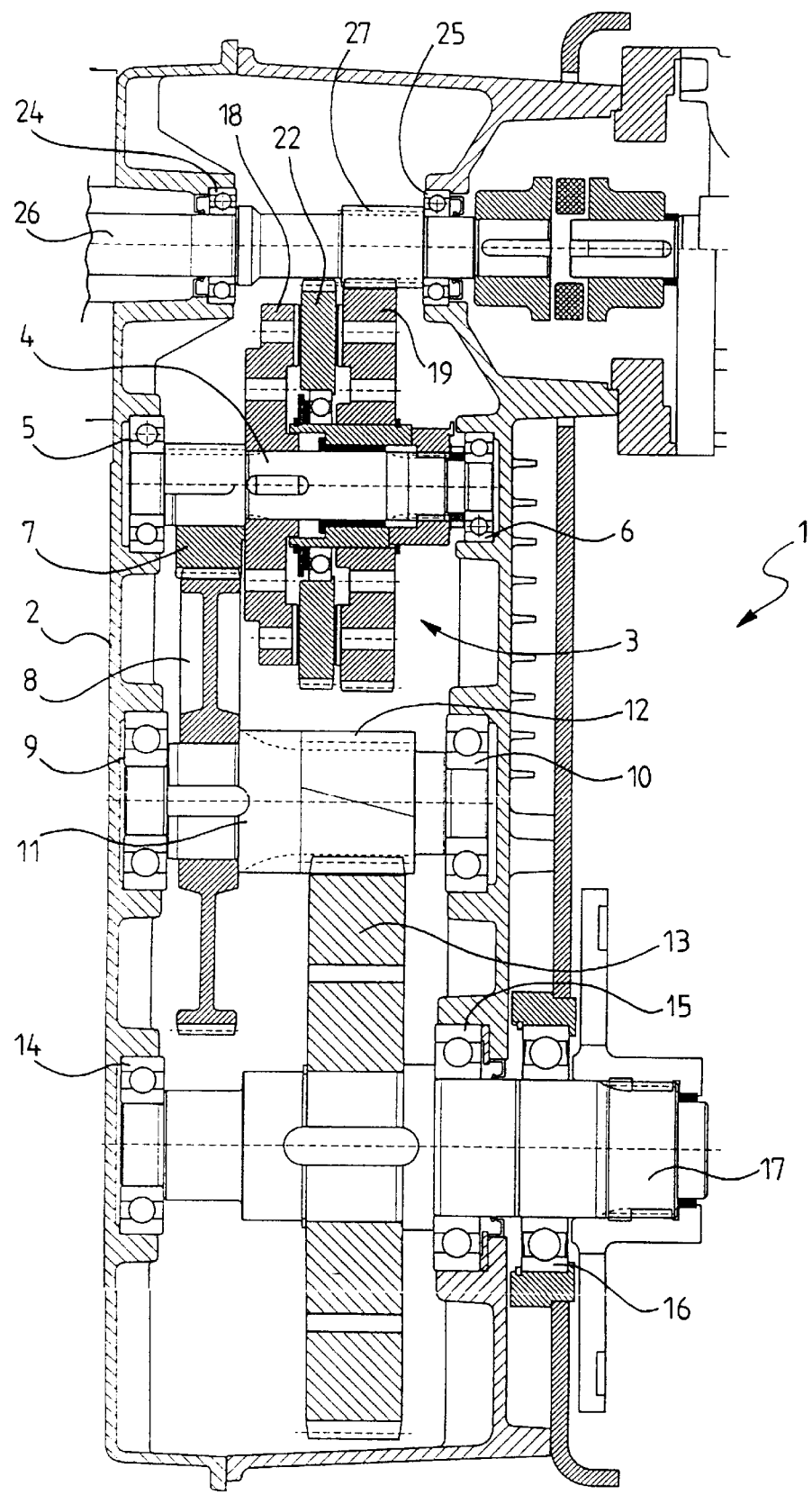
FIG. 1 shows a hoist gear of a hoist, and a load brake according to the invention provided therein.
Figure 2:
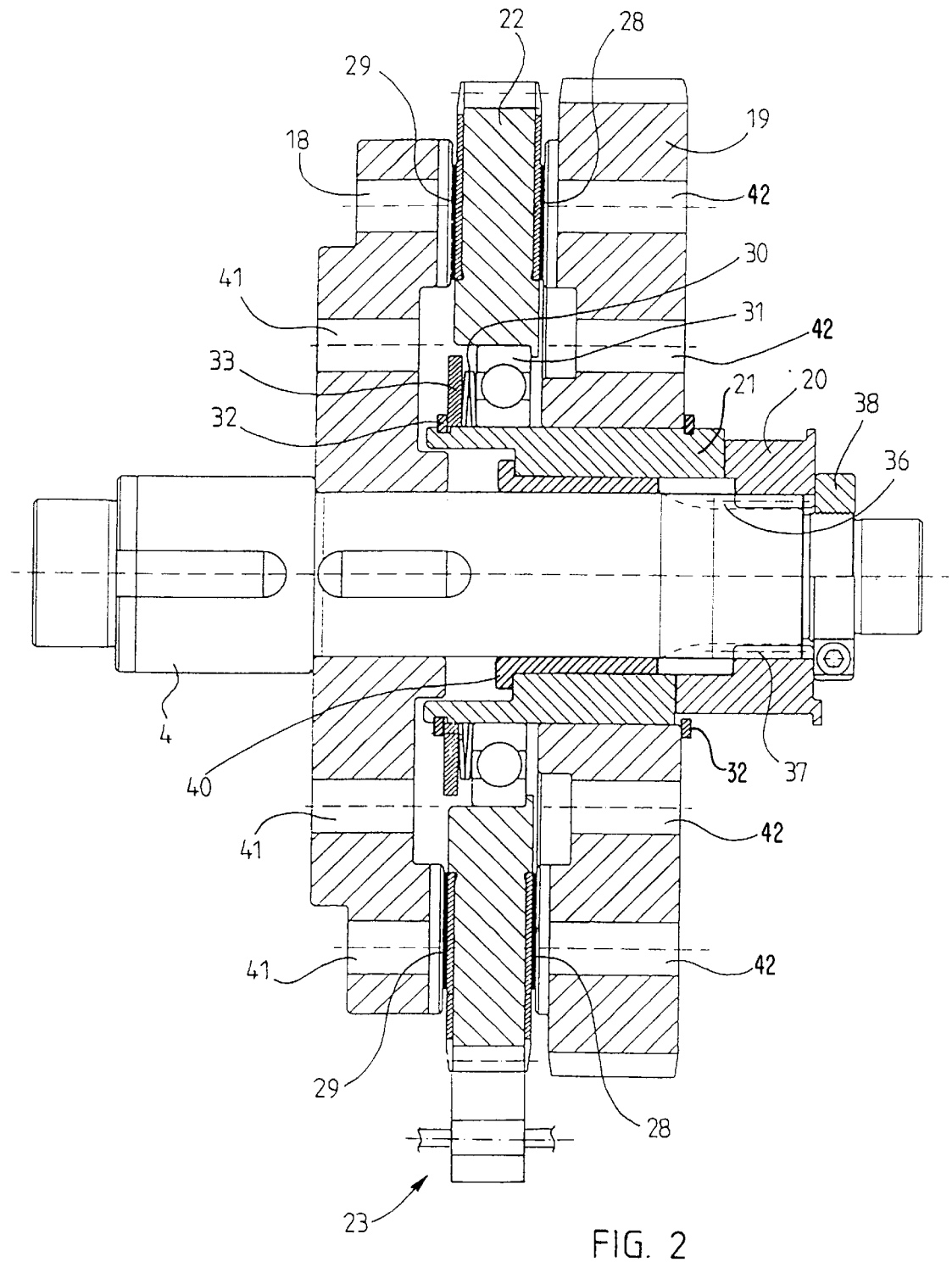
FIG. 2 shows the load brake of FIG. 1 on a larger scale.

FIGS. 1 and 2 show a preferred structure of the load brake according to the invention in connection with a hoist gear 1 that has a frame 2 to which a load shaft 4 of the load brake 3 is mounted from both ends with bearings 5 and 6. One end of the load shaft 4 is provided with a cogwheel 7, which is fixedly arranged thereto and which is arranged to cooperate with a first cogwheel 8 of the gear 1 that is attached to a shaft 11 mounted in bearings 9 and 10 onto the frame 2. The shaft 11 of the first cogwheel 8 in the gear is provided with a cogging 12, which in turn cooperates with a second cogwheel 13 of the gear that is attached to an output shaft 17 of the gear, mounted in bearings 14 to 16 onto the frame 2.

A flange-like pressure plate 18 is fixedly mounted onto the load shaft 4 of the load brake adjacent to the cogwheel 7, and a cogwheel 19 is placed on the load shaft with tension means 20 and 21, which produce an axial movement in the cogwheel 19 as the wheel rotates with respect to the load shaft 4. In this exemplary embodiment, the tension means 20 and 21 comprise an element 20 that is fixedly mounted onto the load shaft 4 and a second element 21 which cooperates with the first element, which is able to rotate with respect to the load shaft 4, which moves axially over a restricted distance during the rotation, and to which the cogwheel 19 is fastened to permit this restricted axial movement. This is a "camnut" construction as described at the beginning and it will be discussed in greater detail below in connection with FIGS. 5 and 6.

A ratchet wheel 22 is placed on the moving element 21 of the tension means between the pressure plate 18 and the cogwheel 19, and this ratchet wheel is allowed to rotate in the hoisting direction of the load (not shown in the figures) but prevented from rotating in the lowering direction of the load, i.e. in the release direction of the load shaft 4, with a pawl 23.

The load is lowered and lifted, in other words the load shaft 4 and the gear shafts 11 and 17 connected thereto are rotated with a hoist motor of which the figure only shows a drive shaft 26 which is mounted in bearings 24 and 25 onto the gear frame 2 and which comprises a cogging 27 that is coupled to the cogwheel 19 of the load brake.

For the purpose of braking the load brake, friction surfaces 28 and 29 are provided between the pressure plate 18 and the ratchet wheel 22, and the ratchet wheel 22 and the cogwheel 19, and these surfaces are attached to the pressure plate 18 and the cogwheel. Consequently, rotation that tends towards the release direction of the load shaft 4 and that is faster than the speed of rotation of the cogwheel brings the pressure plate 18 and the cogwheel 19 closer together axially and makes their friction surfaces 28 and 29 press and slide against the side surfaces of the ratchet wheel 22, which results in the braking of the rotational movement of the load shaft 4. On the other hand, rotation that is directed at the cogwheel 19, that exceeds the braking torque, that is faster than the speed of rotation of the load shaft 4 and that occurs in the release direction of the load shaft 4 removes the pressure plate 18 and the cogwheel 19 further apart axially and thus unlocks the braking connection of the pressure plate 18, the ratchet wheel 22 and the cogwheel 19, so that the hoist motor can lower the load.

In order that the load brake would operate in as fast and sensitive a manner as possible for example when the hoist motor is damaged, in which case the braking system of the motor cannot hold or lower the load in a controlled manner, and that the difference between the torque of the hoist motor and the braking torque of the load brake that is required for lowering the load would be as small as possible and thus the amount of unnecessary frictional energy would remain as small as possible, means 30 are provided in connection with one of the friction pairs formed by the pressure plate 18 and the ratchet wheel 22, and the ratchet wheel 22 and the cogwheel 19. These means produce an axial preclamping force that presses the elements of the friction pair together.

These means for producing the preclamping force are preferably provided in connection with the friction pair formed by the ratchet wheel 22 and the cogwheel 19, such that the moving element 21 is provided with a spring means 30 that presses the ratchet wheel 22 against the cogwheel 19 through a bearing 31 which is mounted slidably axially on the element 21. In this example, the spring means 30 is an annular cup spring, which is placed around the element 21 and one end of which is prevented from moving axially on the element 21 towards the pressure plate 18 by a flange-like stopper 33 that is attached to the element 21 with a locking device 32. Other elements than a cup spring are also possible alternatives for producing an axial force. When spring force is used, it is possible to use for example several coil springs that are placed around the element 21 and that are known from different switch constructions. It is important, however, that the torque between the preclamped friction pair 22, 19 is greater than the friction torque between the stationary and the moving element 20 and 21 of the tension device.

Figure 5:
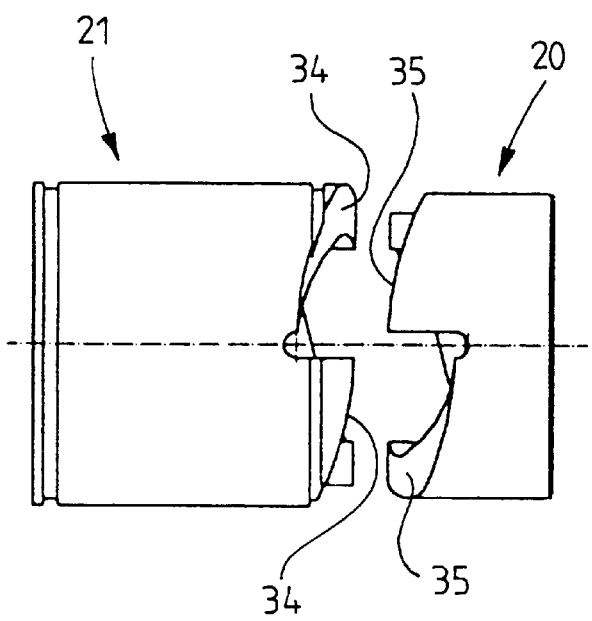
FIG. 5 shows tension means of the load brake shown in FIGS. 1 and 2.
Figure 6:
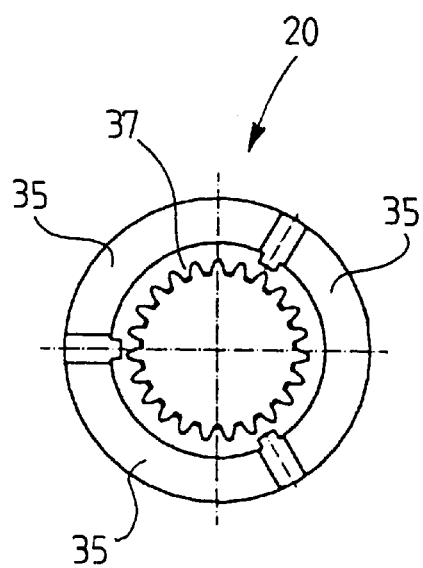
FIG. 6 shows a fixed element in the tension means of FIG. 5, seen from the end of the tension surface.

With reference to FIGS. 2, 5 and 6, the aforementioned "camnut" structure 20, 21 is such that the surfaces of each element 20 and 21 facing each other are formed of corresponding cam surfaces 34 and 35 the number of which in the present example is three. There may naturally also be fewer or for example several more of such surfaces. The fixed element 20 is attached to a cogging 36 provided in the load shaft 4 by means of a corresponding cogging 37 provided in the element 20, and it is locked in place by a locking means 38 of the load shaft 4. The moving element 21 is in turn placed on the load shaft 4 by means of a slide block 40 situated between them. The moving element 21 is able to move axially on the load shaft 4 within limits determined by the pitches of the cam surfaces 34 and 35 and it can rotate on the load shaft 4 over a distance equaling the length of the cam surface in order to implement the above-described braking and the release of the braking connection. In this manner, it is easier to restrict the rotating and axial movements of this "camnut" structure in a desired manner within a certain area compared to a normal screw/nut construction, which can naturally also be used as an alternative structure for the tension means in the present load brake according to the invention. In its simplest form, the "stationary element" is a screw thread provided on the load shaft 4, and the "moving element" is a corresponding thread in the cogwheel 19, but the braking might be less effective with such a construction and it might be more difficult to release the braking connection than with the "camnut" construction. Also, if the ratchet wheel 22 and the preclamping means 30 acting thereon should be fastened for example directly on the load shaft 4 and not on a flange provided in the cogwheel in the screw/nut construction, at least the installation of the preclamping means 30 and the implementation of a sufficient preclamping force might be less advantageous.

Figure 3:
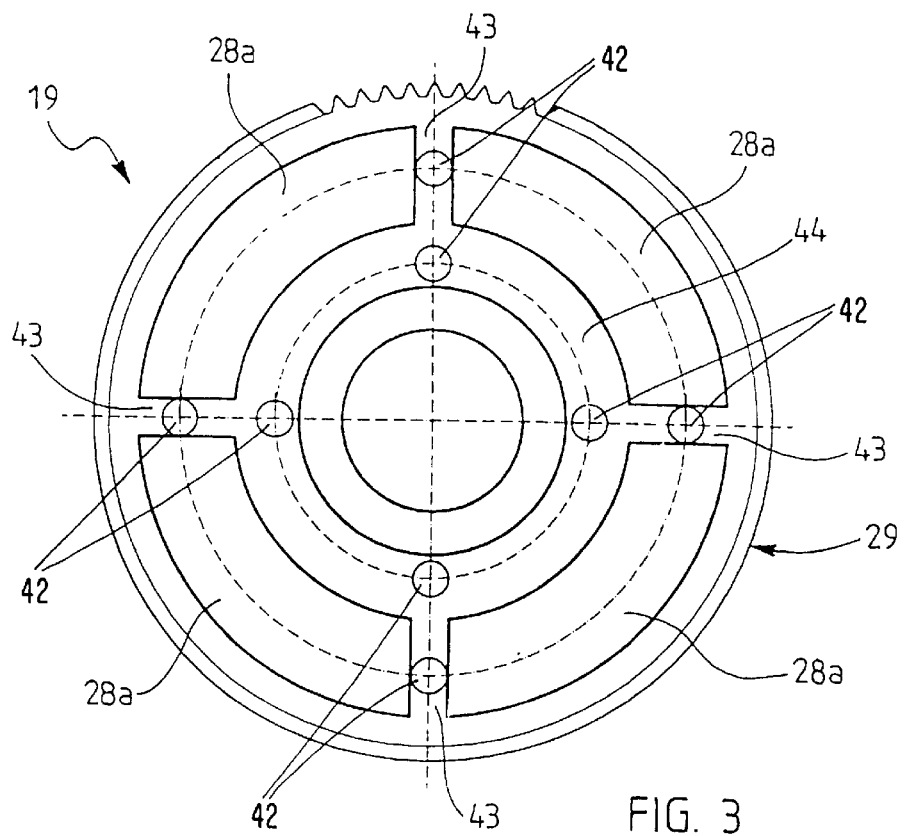
FIG. 3 shows a cogwheel of the load brake that is shown in FIGS. 1 and 2 and that is connected to the shaft of the hoist motor, seen from the side of the friction surface.
Figure 4:
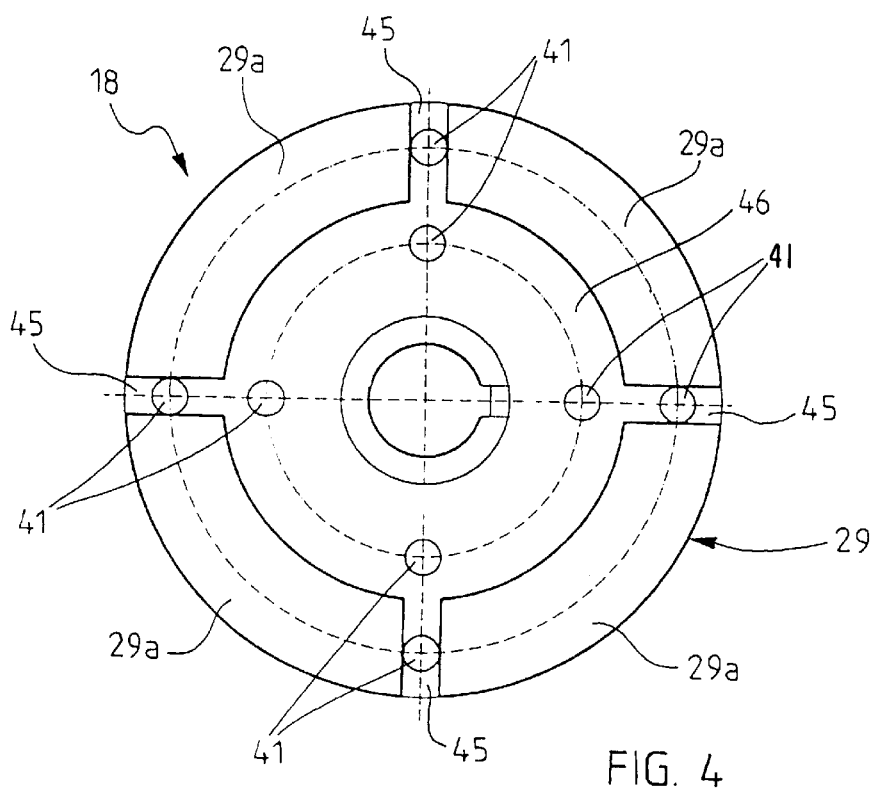
FIG. 4 shows a pressure plate of the load brake shown in FIGS. 1 and 2, seen from the side of the friction surface.

With reference to FIGS. 2, 3 and 4 in particular, the load brake according to the invention also comprises suction holes 41, 42 and ducts 43 to 46 provided in the pressure plate 18 and in the cogwheel 19 for conducting the oil in the hoist gear 1 to the friction surfaces 28 and 29 in order to cool and lubricate them. FIGS. 3 and 4 also show that the friction surfaces (or rather, friction elements) 28 and 29 are divided into several parts 28a and 29a, which are surrounded by the aforementioned ducts 43 to 46. Further, it should be noted that it is also possible to fasten the friction surfaces to the side surfaces of the ratchet wheel 22 or to all surfaces that are in contact.

The invention is described above by means of one preferred embodiment only. However, a person skilled in the art can implement the details of the invention in several alternative manners within the scope of the appended claims and they can also use it in connection with some other equipment than a hoist, e.g. in a burton.

What is claimed is:

1. A load brake comprising:
    a load shaft, the load shaft being rotatable in a release direction;
    a pressure plate that is fixed to the load shaft;
    a cogwheel disposed on the load shaft and operatively connected to a tension device, the tension device producing an axial motion of the cogwheel as the cogwheel rotates with respect to the load shaft;
    a ratchet wheel mounted between the pressure plate and the cogwheel;
    a pawl for preventing rotation of the ratchet wheel at least in the release direction of the load shaft;
    friction surfaces provided between the pressure plate and the ratchet wheel and forming a first friction pair;
    friction surfaces provided between the ratchet wheel and the cogwheel and forming a second friction pair; and
    a biasing device, the biasing device being associated with one of said friction pairs, the biasing device producing an axial force which acts to press the elements of one of said friction pairs together, wherein
    the tension device includes an element fixedly mounted to the load shaft, and a movable element which cooperates with the fixedly mounted element, the movable element being rotatable with respect to the load shaft, and being movable over a limited axial distance during rotation,
    the ratchet wheel is mounted with a bearing on the movable element of the tension device, and
    a spring means is attached to the movable element to press the ratchet wheel against the cogwheel through the bearing of the ratchet wheel.

2. The load brake according to claim 1, wherein the biasing device is associated with the second friction pair.

3. The load brake according to claim 1, wherein the torque between the biased friction pair is greater than the friction torque between the fixedly mounted and movable elements of the tension device.

4. The load brake according to claim 1, wherein suction holes and ducts are provided in the pressure plate and in the cogwheel to conduct oil to the friction surfaces in order to cool and lubricate them.

5. The load brake according to claim 1, wherein the biasing device includes a spring.

6. The load brake according to claim 5, wherein the spring is an annular cup spring.

7. The load brake according to claim 1, wherein a cogwheel is attached to the movable element, the cogwheel enabling the limited axial movement of the movable element.

8. The load brake according to claim 1, wherein the biasing device is a spring disposed around a part of the movable element.

9. The load brake according to claim 1, wherein the axial force is a preclamping force, the preclamping force acting to suppress vibration in the load brake.

10. The load brake according to claim 1, wherein rotation of the load shaft in its release direction and which is faster than a speed of rotation of the cogwheel brings the pressure plate and the cogwheel axially closer together and presses them against the ratchet wheel, resulting in a braking of the rotational motion of the load shaft.

11. The load brake according to claim 10, wherein rotation of the load shaft in the release direction that exceeds a braking torque and that is faster than the speed of rotation of the cogwheel acts to move the pressure plate and the cogwheel axially apart, resulting in an unlocking of a braking connection between the pressure plate, the ratchet wheel, and the cogwheel.

12. The load brake according to claim 11, wherein the biasing device includes a spring disposed adjacent to the tension device.

13. A load brake comprising:

a load shaft, the load shaft being rotatable in a release direction;

a pressure plate fixed to the load shaft;

a cogwheel disposed on the load shaft and operatively connected to a tension device, the tension device producing an axial motion of the cogwheel as the cogwheel rotates with respect to the load shaft;

a ratchet wheel disposed between the pressure plate and the cogwheel and supported on a bearing;

a pawl for preventing rotation of the ratchet wheel at least in the release direction of the load shaft;

friction surfaces provided between the pressure plate and the ratchet wheel and forming a first friction pair;

friction surfaces provided between the ratchet wheel and the cogwheel and forming a second friction pair; and a biasing device disposed on said tension device between the pressure plate and the ratchet wheel, the biasing device producing an axial force for pressing the elements of one of said friction pairs together.

14. The load brake of claim 13, wherein the biasing device produces an axial force for pressing the elements of said one of said friction pairs together, the other of said friction pairs not being biased together by said biasing device.

* * * * *